U S008816014B2

(12) United States Patent  
Yoshida et al.

(10) Patent No.: US 8,816,014 B2  
(45) Date of Patent: Aug. 26, 2014

(54) METHOD FOR PRODUCING MODIFIED CONJUGATED DIENE-BASED POLYMER, MODIFIED CONJUGATED DIENE-BASED POLYMER, AND MODIFIED CONJUGATED DIENE-BASED POLYMER COMPOSITION

(75) Inventors: Junichi Yoshida, Tokyo (JP); Shinichi Sekikawa, Tokyo (JP); Takaaki Matsuda, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 101 days.

(21) Appl. No.: 13/497,575

(22) PCT Filed: Sep. 22, 2010

(86) PCT No.: PCT/JP2010/066431  
§ 371 (c)(1),  
(2), (4) Date: Mar. 22, 2012

(87) PCT Pub. No.: WO2011/040312  
PCT Pub. Date: Apr. 7, 2011

(65) Prior Publication Data  
US 2012/0277369 A1 Nov. 1, 2012

(30) Foreign Application Priority Data  
Oct. 2, 2009 (JP) ................. 2009-230412

(51) Int. Cl.  
C08C 19/22 (2006.01)  
C08C 19/25 (2006.01)  
C08C 19/44 (2006.01)  
C08L 15/00 (2006.01)

(52) U.S. Cl.  
CPC *C08L 15/00* (2013.01); *C08C 19/44* (2013.01)  
USPC .................. 525/332.9; 525/331.9; 525/333.1; 525/333.2; 525/375; 524/572; 524/575

(58) Field of Classification Search  
USPC ............. 525/331.9, 332.9, 333.1, 333.2, 375; 524/572, 575  
See application file for complete search history.

(56) References Cited

U.S. PATENT DOCUMENTS

| 3,333,024 | A | 7/1967 | Haefele et al. |
| 4,501,857 | A | 2/1985 | Kishimoto et al. |
| 4,673,714 | A | 6/1987 | Kishimoto et al. |
| 5,010,203 | A | 4/1991 | Deschler et al. |
| 5,508,333 | A | 4/1996 | Shimizu |
| 5,527,753 | A | 6/1996 | Engel et al. |
| 5,708,092 | A | 1/1998 | Schwindeman et al. |
| 2003/0199669 | A1 | 10/2003 | Saito et al. |
| 2004/0178163 | A1* | 9/2004 | Kerns et al. ............... 215/11.1 |
| 2004/0254301 | A1 | 12/2004 | Tsukimawashi et al. |
| 2006/0173138 | A1 | 8/2006 | Hogan et al. |
| 2009/0036567 | A1 | 2/2009 | Oshima et al. |
| 2009/0163668 | A1 | 6/2009 | Yamada et al. |
| 2009/0203843 | A1 | 8/2009 | Fukuoka et al. |
| 2009/0292043 | A1 | 11/2009 | Kurazumi et al. |
| 2010/0056710 | A1* | 3/2010 | Oshima ........................ 524/571 |
| 2010/0105826 | A1 | 4/2010 | Uesaka |
| 2011/0146877 | A1 | 6/2011 | Tanaka et al. |
| 2011/0160388 | A1 | 6/2011 | Tanaka et al. |
| 2011/0178233 | A1 | 7/2011 | Chaboche et al. |

FOREIGN PATENT DOCUMENTS

| CN | 1894288 A | 1/2007 |
| EP | 2003146 A2 | 12/2008 |
| EP | 2130842 A1 | 12/2009 |
| GB | 1020720 A | 2/1966 |
| GB | 2241239 A | 8/1991 |
| JP | S42-008704 B1 | 4/1967 |
| JP | S43-006636 B1 | 3/1968 |
| JP | S59-140211 A | 8/1984 |
| JP | S63-004841 B2 | 2/1988 |
| JP | H01-037970 B2 | 8/1989 |
| JP | H01-053851 B2 | 11/1989 |
| JP | H02-009041 B2 | 2/1990 |
| JP | H02-045492 A | 2/1990 |
| JP | H02-132104 A | 5/1990 |
| JP | H07-233217 A | 9/1995 |
| JP | H08-109219 A | 4/1996 |
| JP | H11-189616 A | 7/1999 |
| JP | 2001-158834 A | 6/2001 |
| JP | 2003-171418 A | 6/2003 |

(Continued)

OTHER PUBLICATIONS

Office Action issued in corresponding Chinese Patent Application No. 201180013063.5 dated Jul. 3, 2013.  
Search Report issued in corresponding European Patent Application No. 11768946.3 dated Jul. 9, 2013.  
Kolthoff et al. "Determination of Polystyrene in GR-S Rubber" J. Polym. Sci. vol. 1, 1946, pp. 429-433.  
"Safe Process Oils for Tires with Low Environmental Impact" Kautschuk Gummi Kunststoffe 52 1999, pp. 799-805.  
International Preliminary Examination Report issued in related International Application No. PCT/JP2011/059352 dated Nov. 6, 2012.  
Search Report issued in corresponding International Application No. PCT/JP2010/066431 dated Dec. 21, 2010.  
Search Report issued in related International Application No. PCT/JP2011/059352 dated Jul. 19, 2011.  
Office Action issued in related Japanese Patent Application No. 2012-510704 dated Feb. 3, 2014.

*Primary Examiner* — Roberto Rabago  
(74) *Attorney, Agent, or Firm* — Morgan, Lewis & Bockius LLP

(57) ABSTRACT

There are provided a modified conjugated diene-based polymer having a good balance between the hysteresis loss properties and the wet skid resistance, practically sufficient abrasion resistance and fracture strength, and high processability when formed into a vulcanized product, and a modified conjugated diene-based polymer composition. A method for producing a modified conjugated diene-based polymer, comprising: a polymerization step of polymerizing a conjugated diene compound or copolymerizing a conjugated diene compound with an aromatic vinyl compound using an alkali metal compound or an alkaline earth metal compound as a polymerization initiator to obtain a conjugated diene-based polymer having a reactive end, and a modifying step of reacting a compound having a specific structure with the reactive end of the conjugated diene-based polymer.

11 Claims, No Drawings

(56) References Cited

FOREIGN PATENT DOCUMENTS

| | | |
|---|---|---|
| JP | 2004-067982 A | 3/2004 |
| JP | 2004-182894 A | 7/2004 |
| JP | 2005-232351 A | 9/2005 |
| JP | 2005-290355 A | 10/2005 |
| JP | 2008-143943 A | 6/2008 |
| JP | 2008-527150 A | 7/2008 |
| JP | 2008-285558 A | 11/2008 |
| JP | 2009-227858 A | 10/2009 |
| JP | 2009-242788 A | 10/2009 |
| JP | 2009-263537 A | 11/2009 |
| JP | 2009-263538 A | 11/2009 |
| JP | 2009-280805 A | 12/2009 |
| JP | 2009-287020 A | 12/2009 |
| JP | 2010-132872 A | 6/2010 |
| JP | 2011-518934 A | 6/2011 |
| WO | 01/23467 A1 | 4/2001 |
| WO | 2005/056615 A1 | 6/2005 |
| WO | 2006/076629 A1 | 7/2006 |
| WO | 2006/112450 A1 | 10/2006 |
| WO | 2007/034785 A1 | 3/2007 |
| WO | 2007/114203 A1 | 10/2007 |
| WO | 2008/013090 A1 | 1/2008 |
| WO | 2009/133888 A | 11/2009 |

\* cited by examiner

METHOD FOR PRODUCING MODIFIED CONJUGATED DIENE-BASED POLYMER, MODIFIED CONJUGATED DIENE-BASED POLYMER, AND MODIFIED CONJUGATED DIENE-BASED POLYMER COMPOSITION

The present application is a U.S. National Phase Application of International Application No. PCT/JP2010/066431 filed Sep. 22, 2010, which claims the benefit of priority of Japanese Application No. 2009-230412 filed Oct. 2, 2009, the disclosures of which are incorporated herein by reference in their entireties.

TECHNICAL FIELD

The present invention relates to a method for producing a modified conjugated diene-based polymer, a modified conjugated diene-based polymer, and a modified conjugated diene-based polymer composition.

BACKGROUND ART

Recently, consideration for the environmental protection such as reduction of carbon dioxide emission has been socially requested. Specifically, a demand for fuel efficiency in automobiles has been increased. For such a circumstance, as a material for tires for automobiles, particularly a material for a tire tread contacting the ground, development of a material exhibiting low rolling resistance has been demanded. On the other hand, from the viewpoint of safety, development of a material exhibiting excellent wet skid resistance, and practically sufficient abrasion resistance and fracture characteristics has been demanded.

Conventionally, as a reinforcing filler for the tire tread, carbon black, silica, and the like have been used. Use of silica has an advantage of achieving the lowered hysteresis loss properties and the improved wet skid resistance. However, contrary to carbon black having a hydrophobic surface, silica having a hydrophilic surface has disadvantages such as small affinity with a conjugated diene rubber and dispersibility inferior to that of carbon black. For this reason, a silane coupling agent and the like need to be additionally contained in order to improve dispersibility and bond silica to the rubber.

Further, recently, attempts have been made to reduce hysteresis loss by introducing a functional group having affinity and/or reactivity with silica into a chain end of a rubber molecule having high mobility. The introduction of a functional group to the chain end can reduce the hysteresis loss by improving the dispersibility of silica in a rubber material, and further, by reducing the number of free polymer ends via bond with the filler particles. For example, Patent Document 1 discloses a modified diene rubber obtained by reacting a modifier having a glycidyl amino group with a polymer end, and Patent Document 2 discloses a modified diene rubber obtained by reacting glycidoxyalkoxysilane with a polymer end. Further, Patent Documents 3 to 7 disclose modified diene rubbers obtained by reacting alkoxysilanes containing an amino group with a polymer end, and compositions comprising these modified diene rubbers and silica.

PATENT DOCUMENT

Patent Document 1: International Publication No. WO 01/23467
Patent Document 2: Japanese Patent Laid-Open No. 07-233217
Patent Document 3: Japanese Patent Laid-Open No. 2001-158834
Patent Document 4: Japanese Patent Laid-Open No. 2003-171418
Patent Document 5: International Publication No. WO 07/34785
Patent Document 6: International Publication No. WO 08/13090
Patent Document 7: International Publication No. WO 07/114,203

SUMMARY OF THE INVENTION

Problems to be Solved by the Invention

In the case where a functional group having high reactivity with silica is introduced into the polymer end, however, the functional group tends to react with silica particles during a kneading step to increase viscosity of the composition, leading to inferior processability such as difficulties in kneading the composition and frequent occurring sheet surface roughness and sheet breakage in the sheeting process after kneading. Moreover, when the composition is formed into a vulcanized product, particularly when the composition is formed into a vulcanized product containing an inorganic filler, a more improved balance between the hysteresis loss properties and the wet skid resistance is demanded.

The present invention has been made in consideration of such circumstances, and an object of the present invention is to provide a method for producing a modified conjugated diene-based polymer, a modified conjugated diene-based polymer, and a modified conjugated diene-based polymer composition, in which the modified conjugated diene-based polymer has a good balance between the hysteresis loss properties and the wet skid resistance, practically sufficient abrasion resistance and fracture strength, and high processability when the modified conjugated diene-based polymer is formed into a vulcanized product.

Means for Solving the Problems

As a result of extensive research in order to solve the problems above, the present inventors found out that a method for producing a modified conjugated diene-based polymer can solve the problems above, the method comprising: a step of polymerizing a conjugated diene compound or copolymerizing a conjugated diene compound with an aromatic vinyl compound using an alkali metal compound or an alkaline earth metal compound as a polymerization initiator to obtain a conjugated diene-based polymer having a reactive end; and a modifying step of reacting a compound having a specific structure with the reactive end of the conjugated diene-based polymer. Thus, the present invention has been completed.

The present invention is as follows.

[1]

A method for producing a modified conjugated diene-based polymer, comprising:
a polymerization step of polymerizing a conjugated diene compound or copolymerizing a conjugated diene compound with an aromatic vinyl compound using an alkali metal compound or an alkaline earth metal compound as a polymerization initiator to obtain a conjugated diene-based polymer having a reactive end, and
a modifying step of reacting a modifier with the reactive end of the conjugated diene-based polymer, the modifier being a compound which has one or more heterocyclic structures comprising two or more nitrogen atoms and a hydrocarbon, and which has two or more silyl groups to which two or more alkoxy groups are bonded.

[2]
The method for producing the modified conjugated diene-based polymer according to [1], wherein the modifier is a compound represented by formula (1):

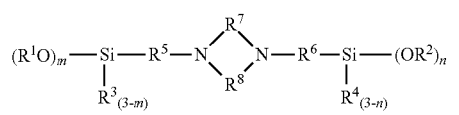

(1)

(wherein $R^1$ to $R^4$ each independently represent an alkyl group or aryl group having 1 to 20 carbon atoms; $R^5$ and $R^6$ each independently represent an alkylene group having 1 to 20 carbon atoms; $R^7$ and $R^8$ each independently represent a hydrocarbon group having 1 to 6 carbon atoms, and form a ring structure of a 5 or more membered ring with adjacent two Ns; and m and n each independently represent an integer of 2 or 3).

[3]
The method for producing the modified conjugated diene-based polymer according to [1] or [2], wherein all the silyl groups in the modifier are each silyl group to which three alkoxy groups are bonded.

[4]
The method for producing the modified conjugated diene-based polymer according to any one of [1] to [3], wherein a total number of moles of the alkoxy group bonded to the silyl group in the modifier is within a range of 0.8 to 3 times number of moles of the polymerization initiator to be added.

[5]
The method for producing the modified conjugated diene-based polymer according to any one of [1] to [4], wherein the polymerization step is continuous.

[6]
The method for producing the modified conjugated diene-based polymer according to any one of [1] to [5], wherein a polystyrene equivalent number average molecular weight of the modified conjugated diene-based polymer measured by gel permeation chromatography (GPC) is 200,000 to 600,000.

[7]
A modified conjugated diene-based polymer obtained by the method for producing the modified conjugated diene-based polymer according to any one of [1] to [6].

[8]
A modified conjugated diene-based polymer composition, comprising:
100 parts by mass of a rubber component containing not less than 20 parts by mass of the modified conjugated diene-based polymer according to [7], and
0.5 to 300 parts by mass of a silica-based inorganic filler.

Advantageous Effects of the Invention

According to the present invention, a method for producing a modified conjugated diene-based polymer, a modified conjugated diene-based polymer, and a modified conjugated diene-based polymer composition can be provided in which the modified conjugated diene-based polymer has a good balance between the hysteresis loss properties and the wet skid resistance, practically sufficient abrasion resistance and fracture strength, and high processability when the modified conjugated diene-based polymer is formed into a vulcanized product.

MODES FOR CARRYING OUT THE INVENTION

Hereinafter, an embodiment for implementing the present invention (hereinafter, referred to as "the present embodiment") will be described in detail. The present embodiment below is only an example for describing the present invention, and the present invention will not be limited to contents below. The present invention can be properly modified within the scope of the gist and implemented.

A method for producing a modified conjugated diene-based polymer according to the present embodiment comprises:
a polymerization step of polymerizing a conjugated diene compound or copolymerizing a conjugated diene compound with an aromatic vinyl compound using an alkali metal compound or an alkaline earth metal compound as a polymerization initiator to obtain a conjugated diene-based polymer having a reactive end, and
a modifying step of reacting a modifier with the reactive end of the conjugated diene-based polymer, the modifier being a compound which has one or more heterocycles comprising two or more nitrogen atoms and a hydrocarbon and which has two or more silyl groups to which two or more alkoxy groups are bonded.

In the polymerization step of the modified conjugated diene-based polymer according to the present embodiment, a conjugated diene compound is polymerized or copolymerized with an aromatic vinyl compound using an alkali metal compound or an alkaline earth metal compound as a polymerization initiator to obtain a conjugated diene-based polymer having a reactive end.

The conjugated diene-based polymer that forms a modified conjugated diene-based polymer is a polymer of a single conjugated diene compound, a polymer of different kinds of conjugated diene compounds, i.e., a copolymer of different kinds of conjugated diene compounds, or a copolymer of a conjugated diene compound and an aromatic vinyl compound.

The conjugated diene compound may be any polymerizable monomer and is not particularly limited. Examples of the polymerizable monomer may include 1,3-butadiene, isoprene, 2,3-dimethyl-1,3-butadiene, 1,3-pentadiene, 3-methyl-1,3-pentadiene, 1,3-heptadiene, and 1,3-hexadiene. Among these, preferable are 1,3-butadiene and isoprene from the viewpoint of industrial availability. One of these may be used alone, or two or more thereof may be used in combination.

The aromatic vinyl compound may be a monomer copolymerizable with the conjugated diene compound, and is not particularly limited. Examples of the aromatic vinyl compound may include styrene, p-methylstyrene, α-methylstyrene, vinylethylbenzene, vinylxylene, vinylnaphthalene, and diphenylethylene. Among these, preferable is styrene from the view point of industrial availability. One of these may be used alone, or two or more thereof may be used in combination.

In the case where the conjugated diene-based polymer is a copolymer, it may be a random copolymer or a block copolymer. Examples of the random copolymer may include butadiene-isoprene random copolymers, butadiene-styrene random copolymers, isoprene-styrene random copolymers, and butadiene-isoprene-styrene random copolymers. Examples of composition distribution of the respective monomers in the copolymer chain may include perfect random copolymers having a composition close to a statistical random composition, or a tapered random copolymer in which distribution of the composition is tapered. The composition having a form of linkage of the conjugated diene, i.e., 1,4-linkage, 1,2-linkage and the like may be uniform or distributed.

Examples of the block copolymer may include diblock copolymers composed of two blocks, triblock copolymers composed of three blocks, tetrablock copolymers composed of four blocks and the like. For example, the block copolymer is expressed as an S-B diblock copolymer, an S-B-S triblock copolymer, or an S-B-S-B tetrablock copolymer wherein S represents a block composed of an aromatic vinyl compound such as styrene, and B represents a block composed of the conjugated diene compound such as butadiene and isoprene and/or a block composed of the copolymer of the aromatic vinyl compound and the conjugated diene compound. In the formula above, the boundary between the blocks does not always need to be clearly distinguished. In the case where the block B is the copolymer of the aromatic vinyl compound and the conjugated diene compound, the aromatic vinyl compound in the block B may be uniformly distributed, or distributed in a tapered manner. Alternatively, in the block B, several portions in which the aromatic vinyl compound is uniformly distributed and/or several portions in which the aromatic vinyl compound is distributed in a tapered manner may coexist. Alternatively, in the block B, several segments having different contents of the aromatic vinyl compound may coexist. In the case where several blocks S or several blocks B exist in the copolymer, the molecular weight and the structure, such as the composition, of these blocks may be the same or different.

In the present embodiment, the conjugated diene-based polymer having a functional group is further hydrogenated in an inactive solvent. Thereby, all or part of double bonds can be converted into saturated hydrocarbons. In this case, heat resistance and weatherability can be improved to prevent deterioration of products during processing at a high temperature. As a result, the obtained products demonstrate higher performance in various applications such as application to automobiles.

More specifically, the hydrogenation ratio of unsaturated double bonds based on the conjugated diene compound can be arbitrarily selected according to the purpose, and is not particularly limited. In use as a vulcanized rubber, preferably, the double bonds in the conjugated diene portion partially remain. From such a viewpoint, the hydrogenation ratio of the conjugated diene portion in the polymer is preferably from 3 to 70%, more preferably from 5 to 65%, and still more preferably from 10 to 60%. The hydrogenation ratio of the aromatic double bonds based on the aromatic vinyl compound in the copolymer of the conjugated diene compound and the aromatic vinyl compound is not particularly limited, and is preferably not more than 50%, more preferably not more than 30%, and still more preferably not more than 20%. The hydrogenation ratio can be measured by a nuclear magnetic resonance spectrometer (NMR).

A method for hydrogenation is not particularly limited, and a known method can be used. Examples of a particularly suitable method for hydrogenation may include a method of blowing gaseous hydrogen into a polymer solution in the presence of a catalyst to perform hydrogenation. Examples of the catalyst may include heterogeneous catalysts such as catalysts having a noble metal supported on a porous inorganic substance; and homogeneous catalysts such as catalysts obtained by making a salt such as nickel and cobalt soluble and reacting the salt with organic aluminum or the like, and catalysts using metallocene such as titanocene. Among these, preferable are titanocene catalysts from the viewpoint of allowing selection of a particularly mild hydrogenation condition. Moreover, an aromatic group can be hydrogenated using a supported noble metal catalyst.

Specific examples of the hydrogenation catalyst may include (1) supported heterogeneous hydrogenation catalysts having a metal such as Ni, Pt, Pd, and Ru supported on carbon, silica, alumina, and diatomite, (2) the so-called Ziegler hydrogenation catalyst using an organic acid salt such as Ni, Co, Fe, and Cr or a transition metal salt such as acetylacetone salts and a reducing agent such as organoaluminum, and (3) the so-called organometal complexes of organometal compounds such as Ti, Ru, Rh, and Zr. For example, as the hydrogenation catalyst, hydrogenation catalysts described in Japanese Patent Publication Nos. 42-8704, 43-6636, 63-4841, 1-37970, 1-53851, and 2-9041, and Japanese Patent Laid-Open No. 8-109219 can be used. Examples of a preferable hydrogenation catalyst may include a reaction mixture of a titanocene compound and a reducing organometal compound.

The alkali metal compound used as the polymerization initiator is not particularly limited, and organolithium compounds are preferable. Examples of the organolithium compound may include low molecule compounds, organolithium compounds of solubilized oligomers, compounds comprising carbon-lithium bonds in the bonding form of an organic group and lithium, compounds comprising nitrogen-lithium bonds, and compounds comprising tin-lithium bonds. Examples of the organolithium compound may include n-butyllithium, sec-butyllithium, tert-butyllithium, n-hexyllithium, benzyllithium, phenyllithium, and stilbenelithium. Examples of the compound comprising nitrogen-lithium bonds may include lithium dimethylamide, lithium diethylamide, lithium dipropylamide, lithium di-n-hexylamide, lithium diisopropylamide, lithium hexamethyleneimide, lithium pyrrolidide, lithium piperidide, lithium heptamethyleneimide, and lithium morpholide.

In addition to the mono-organolithium compounds, a polyfunctional organolithium compound can be used in combination to perform polymerization. Examples of the polyfunctional organolithium compound may include 1,4-dilithiobutane, a reaction product of sec-butyllithium and diisopropenylbenzene, 1,3,5-trilithiobenzene, a reaction product of n-butyllithium, 1,3-butadiene, and divinylbenzene, and reaction products of n-butyllithium and polyacetylene compounds. Further, organoalkali metal compounds disclosed in U.S. Pat. No. 5,708,092, British Patent No. 2,241, 239, U.S. Pat. No. 5,527,753, and the like can also be used.

As the organolithium compound, preferable are n-butyllithium and sec-butyllithium from the viewpoints of industrial availability and easiness to control a polymerization reaction.

One of these organolithium compounds may be used, or two or more thereof may be used as a mixture.

Examples of other organoalkali metal compounds may include organosodium compounds, organopotassium compounds, organorubidium compounds, and organocesium compounds. Specifically, examples thereof may include sodium naphthalene and potassium naphthalene. Besides, examples thereof may include alkoxides, sulfonates, carbonates, and amides of lithium, sodium, and potassium. Moreover, the other organoalkali metal compounds may be used in combination with other organometal compound.

Examples of the alkaline earth metal compound may include organomagnesium compounds, organocalcium compounds, and organostrontium compounds. Specifically, examples thereof may include dibutylmagnesium, ethylbutylmagnesium, and propylbutylmagnesium. Moreover, compounds such as alkoxides, sulfonates, carbonates, and amides of alkaline earth metals may be used. These organoalkaline earth metal compounds may be used in combination with an alkali metal compound or other organometal compound.

In the present embodiment, the conjugated diene-based polymer is preferably obtained by growth by an anionic polymerization reaction using the alkali metal compound and/or the alkaline earth metal compound as the polymerization initiator. Particularly, the conjugated diene-based polymer is more preferably a polymer having a reactive end and obtained by a propagation reaction by living anionic polymerization. Thereby, a modified conjugated diene-based polymer having a high modification ratio can be obtained. The form of the polymerization is not particularly limited, and the polymerization can be performed in batch or in a continuous manner using two or more reactors connected to each other. Particularly, a continuous polymerization step is preferable because a relatively high molecular weight polymer can be stably produced.

If the conjugated diene compound contains allenes, acetylenes, and the like as impurities, the modification reaction described later may be inhibited. For this reason, the total of the concentrations (mass) of these impurities is preferably not more than 200 ppm, more preferably not more than 100 ppm, and still more preferably not more than 50 ppm. Examples of allenes may include propadiene and 1,2-butadiene. Examples of acetylenes may include ethylacetylene and vinylacetylene.

Preferably, the polymerization reaction of the conjugated diene-based polymer is performed in a solvent. Examples of the solvent may include hydrocarbon solvents such as saturated hydrocarbons and aromatic hydrocarbons. Specifically, examples of the hydrocarbon solvents may include aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, and xylene and hydrocarbons comprising a mixture thereof. Preferably, impurities such as allenes and acetylenes are treated with an organometal compound before the conjugated diene compound is subjected to the polymerization reaction because a polymer having a reactive end in a high concentration is likely to be obtained and further a higher modification ratio is likely to be achieved.

In the polymerization reaction of the conjugated diene-based polymer, a small amount of a polar compound may be added in order to randomly copolymerize an aromatic vinyl compound with a conjugated diene compound, in order to control a microstructure of a conjugated diene moiety of a copolymer as a vinylating agent, and in order to improve a polymerization rate.

As the polar compound, ethers such as tetrahydrofuran, diethyl ether, dioxane, ethylene glycol dimethylether, ethylene glycol dibutylether, diethylene glycol dimethylether, diethylene glycol dibutylether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-t-amylate, potassium-t-butyrate, sodium-t-butyrate, and sodium amylate; phosphine compounds such as triphenylphosphine, and the like can be used. One of these polar compounds may be used alone, or two or more thereof may be used in combination.

The amount of the polar compound to be used is not particularly limited, and is selected depending on the purpose and the degree of the effect. Generally, the amount of the polar compound to be used is preferably from 0.01 to 100 mol based on 1 mol of the polymerization initiator. Such a polar compound (vinylating agent) may be properly used as a regulator for the microstructure of the conjugated diene portion in the polymer depending on a desired vinyl linkage content. Many polar compounds simultaneously have an effective randomizing effect in the copolymerization of the conjugated diene compound with the aromatic vinyl compound, and can be used for adjustment of distribution of the aromatic vinyl compound or as an adjuster for the amount of the styrene block. As a method for randomizing the conjugated diene compound and the aromatic vinyl compound, a method may be used in which part of 1,3-butadiene is intermittently added during the copolymerization, as described in Japanese Patent Laid-Open No. 59-140211.

The polymerization temperature is not particularly limited as long as it is a temperature at which the polymerization reaction such as living anionic polymerization progresses. From the viewpoint of productivity, the temperature is preferably not less than 0° C. From the viewpoint of securing a sufficient reaction amount of the modifier to the reactive end after the polymerization is terminated, the temperature is preferably not more than 120° C.

Moreover, from the viewpoint of preventing cold flow of the conjugated diene-based polymer, a polyfunctional aromatic vinyl compound such as divinylbenzene may be used for control of branching.

The amount of conjugated diene to be bonded in the conjugated diene-based polymer according to the present embodiment is not particularly limited, and the amount is preferably from 50 to 100% by mass, and more preferably from 60 to 80% by mass. The amount of aromatic vinyl to be bonded in the conjugated diene-based polymer according to the present embodiment is not particularly limited, and the amount is preferably from 0 to 50% by mass, and more preferably from 20 to 40% by mass. If the amount of conjugated diene to be bonded and the amount of aromatic vinyl to be bonded are within the ranges, a vulcanized product can be obtained in which the balance between the hysteresis loss properties and the wet skid resistance is better and the abrasion resistance and fracture strength are satisfactory. Here, the amount of aromatic vinyl to be bonded can be measured by ultraviolet absorption of a phenyl group. From this, the amount of conjugated diene to be bonded can also be determined. Specifically, the amount of aromatic vinyl to be bonded can be measured by the method according to Examples described later.

Moreover, the vinyl linkage content in the conjugated diene bond units is not particularly limited, and it is preferably from 10 to 75 mol %, and more preferably from 25 to 65 mol %. At a vinyl linkage content within the range, a vulcanized product can be obtained in which the balance between the hysteresis loss properties and the wet skid resistance is better and the abrasion resistance and fracture strength are satisfactory. Here, in the case where the modified conjugated diene-based polymer is a copolymer of butadiene and styrene, the vinyl linkage content (1,2-linkage content) in the butadiene bond units can be determined by a Hampton method (R. R. Hampton, Analytical Chemistry, 21, 923 (1949)).

If the microstructure (amounts of the respective bonds in the modified conjugated diene-based polymer) is within the range, and the glass transition temperature of the copolymer is within the range of −45 to −15° C., a vulcanized product can be obtained in which the balance between the hysteresis loss properties and the wet skid resistance is much better. As the glass transition temperature, according to ISO 22768: 2006, a DSC curve is recorded while the temperature is raised in a predetermined temperature range. The peak top of the DSC differentiation curve (Inflection point) is defined as the glass transition temperature.

In the case where the conjugated diene-based polymer according to the present embodiment is the conjugated diene-aromatic vinyl copolymer, preferably, there are few or no poly aromatic vinyl blocks in which not less than 30 aromatic vinyl units are chained. Specifically, in the case where the copolymer is a butadiene-styrene copolymer, the polymer is decomposed by a Kolthoff method (a method described in I. M. KOLTHOFF, et al., J. Polym. Sci. 1, 429 (1946)). In a known method for analyzing the amount of polystyrene insoluble in methanol, the proportion of the block in which not less than 30 aromatic vinyl units are chained is preferably not more than 5% by mass, and more preferably not more than 3% by mass based on the amount of the polymer.

By the method described above, the conjugated diene-based polymer having a reactive end is obtained, and a modifying step of reacting a modifier with the reactive end is performed, the modifier being a compound which has one or more heterocycles comprising two or more nitrogen atoms and a hydrocarbon and which has two or more silyl groups to which two or more alkoxy groups are bonded. Thereby, the modified conjugated diene-based polymer according to the present embodiment can be obtained. The compound which has one or more heterocycles comprising two or more nitrogen atoms and a hydrocarbon and which has two or more silyl groups to which two or more alkoxy groups are bonded is used as the modifier. Thereby, a bond can be formed between the terminal of the conjugated diene-based polymer and Si.

In the compound used as the modifier, all the silyl groups are each preferably a silyl group to which three alkoxy groups are bonded. If the compound is used as the modifier, the reactivity of the modifier and interaction properties of the modifier with other compound can be further enhanced, and the processability of the modified conjugated diene-based polymer to be obtained can be further enhanced.

Among those described above, preferable is the modifier that is the compound represented by formula (1). If the alkoxysilyl group in formula (1) efficiently reacts with the reactive end of the conjugated diene-based polymer, the bond between the terminal of the conjugated diene-based polymer and Si can be formed more efficiently.

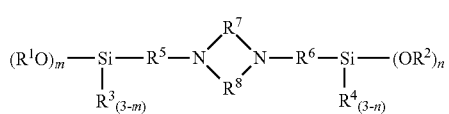

(1)

(wherein $R^1$ to $R^4$ each independently represent an alkyl group or aryl group having 1 to 20 carbon atoms; $R^5$ and $R^6$ each independently represent an alkylene group having 1 to 20 carbon atoms; $R^7$ and $R^8$ each independently represent a hydrocarbon group having 1 to 6 carbon atoms and form a ring structure of 5 or more membered ring with adjacent two Ns; and m and n each independently represent an integer of 2 or 3).

Examples of the modifier represented by formula (1) may include 1,4-bis[3-(trimethoxysilyl)propyl]piperazine, 1,4-bis[3-(triethoxysilyl)propyl]piperazine, 1,4-bis[3-(dimethoxymethylsilyl)propyl]piperazine, 1,3-bis[3-(trimethoxysilyl)propyl]imidazolidine, 1,3-bis[3-(triethoxysilyl)propyl]imidazolidine, 1,3-bis[3-(diethoxyethylsilyl)propyl]imidazolidine, 1,3-bis[3-(trimethoxysilyl)propyl]hexahydropyrimidine, 1,3-bis[3-(triethoxysilyl)propyl]hexahydropyrimidine, and 1,3-bis[3-(tributoxysilyl)propyl]-1,2,3,4-tetrahydropyrimidine.

Among these, preferable are those wherein m and n are 3 from the viewpoint of the reactivity of the modifier, interaction properties with other compounds, e.g., inorganic filler such as silica, and the processability of the modified conjugated diene-based polymer to be obtained. Specifically, 1,4-bis[3-(trimethoxysilyl)propyl]piperazine, 1,4-bis[3-(triethoxysilyl)propyl]piperazine, 1,3-bis[3-(trimethoxysilyl)propyl]imidazolidine, 1,3-bis[3-(triethoxysilyl)propyl]imidazolidine, 1,3-bis[3-(trimethoxysilyl)propyl]hexahydropyrimidine, 1,3-bis[3-(triethoxysilyl)propyl]hexahydropyrimidine, 1,3-bis[3-(tributoxysilyl)propyl]-1,2,3,4-tetrahydropyrimidine are preferable. Among these, 1,4-bis[3-(trimethoxysilyl)propyl]piperazine, and 1,4-bis[3-(triethoxysilyl)propyl]piperazine are more preferable.

The modifier may contain other compounds, e.g., impurities such as an intermediate product during synthesis of the modifier and a condensate of the modifier as long as these do not significantly adversely affect the modification reaction and the like. Alternatively, other conventionally known modifiers may be used in combination within the range in which the effect of the present embodiment is obtained.

The reaction temperature and reaction time when the modifier is reacted with the reactive end are not particularly limited. The reaction is made preferably at 0 to 120° C. for not less than 30 seconds.

In the modifier, the total number of moles of the alkoxy group to bond to the silyl group in the compound is preferably within the range of 0.8 to 3 times, more preferably within the range of 1 to 2.5 times, and still more preferably within the range of 1 to 2 times the number of moles of the polymerization initiator to be added. The total number of moles of the alkoxy group is preferably 0.8 times or more from the viewpoint of obtaining a sufficient modification ratio in the modified conjugated diene-based polymer to be obtained, and preferably 3 times or less from the viewpoint of cost of the modifier. Preferably, from the viewpoint of improving the processability, the polymer ends are coupled to each other to obtain a branched polymer component.

From the viewpoint of further enhancing the effect of the present embodiment, the modified conjugated diene-based polymer is preferably produced so that the polymer contains preferably not less than 5% by mass, more preferably not less than 20% by mass, and still more preferably not less than 50% by mass of the polymer having a functional group component (the modified conjugated diene-based polymer modified with the modifier). As a method for determining the polymer having a functional group component, chromatography can be used for measurement in which a modified component containing a functional group can be separated from a non-modified component. Examples of the method using chromatography may include a method in which determination is performed using GPC column packed with a polar substance that adsorbs the functional group component, such as silica, as a filler, and using the internal standard of a non-adsorbed component for comparison.

The polystyrene equivalent number average molecular weight (Mn) of the modified conjugated diene-based polymer according to the present embodiment obtained by gel permeation chromatography (GPC) is preferably from 20,000 to 2,000,000, more preferably from 100,000 to 1,000,000, still more preferably from 200,000 to 600,000, and still further more preferably from 300,000 to 400,000. At a molecular weight not less than the lower limit value, the strength when the modified conjugated diene-based polymer is formed into a vulcanized product can be further improved. At a molecular weight not more than the upper limit value, the processability can be further improved. From the viewpoint of physical properties of the vulcanized product, a ratio (Mw/Mn) of the weight average molecular weight (Mw) to the number average molecular weight (Mn) is preferably from 1.05 to 3.0, and more preferably from 1.1 to 2.5.

In the method for producing the modified conjugated diene-based polymer according to the present embodiment, after the modification reaction is performed, a deactivating agent, a neutralizer and the like may be added to the copolymer solution when necessary. Examples of the deactivating agent may include water; and alcohols such as methanol, ethanol, and isopropanol. Examples of the neutralizer may include carboxylic acids such as stearic acid, oleic acid, and versatic acid; and aqueous solutions of inorganic acids and carbon dioxide gas.

From the viewpoints of preventing formation of gel in a finishing step after the polymerization, and improving stability during processing, a stabilizer for rubber is preferably added to the modified conjugated diene-based polymer according to the present embodiment. The stabilizer for rubber is not particularly limited, and a known one can be used. Preferable are 2,6-di-tert-butyl-4-hydroxytoluene (BHT), n-octadecyl-3-(4'-hydroxy-3',5'-di-tert-butylphenol)propionate, 2-methyl-4,6-bis[(octylthio)methyl]phenol, and the like.

In order to improve the processability of the modified conjugated diene-based polymer according to the present embodiment, an extender oil can be added to the modified conjugated diene-based polymer when necessary. The method for adding an extender oil to a modified conjugated diene-based polymer is not particularly limited. Preferable is a method in which an extender oil is added to a polymer solution, and mixed to prepare an extended copolymer solution, and the solvent is removed from the oil-extended copolymer solution. Examples of the extender oil may include aromatic oils, naphthenic oils, and paraffinic oils. Among these, preferable are alternative aromatic oils containing a polycyclic aromatic (PCA) component whose content determined according to the IP 346 method is not more than 3% by mass, from the viewpoint of environmental safety, prevention of oil bleeding and wet grip properties. Examples of the alternative aromatic oils may include TDAE and MES shown in Kautschuk Gummi Kunststoffe 52(12) 799 (1999), and RAE. The amount of the extender oil to be added is not particularly limited. Generally, the amount is 10 to 60 parts by mass, and preferably 20 to 37.5 parts by mass based on 100 parts by mass of the modified conjugated diene-based polymer.

As the method for obtaining the modified conjugated diene-based polymer according to the present embodiment from the polymer solution, a known method can be used. Examples of the method may include a method in which a solvent is removed by steam stripping or the like, and a polymer is filtered off, dewatered and dried to obtain a polymer; a method in which a polymer solution is condensed using a flushing tank, and volatilized by a vent extruder or the like; and a method in which a polymer solution is directly volatilized by a drum drier or the like.

The modified conjugated diene-based polymer according to the present embodiment is suitably used as a vulcanized product. For example, the vulcanized product can be obtained as follows: the modified conjugated diene-based polymer according to the present embodiment is mixed with an inorganic filler such as a silica-based inorganic filler and carbon black, a rubbery polymer other than the modified conjugated diene-based polymer according to the present embodiment, a silane coupling agent, a rubber softener, a vulcanizing agent, a vulcanization accelerator and aid, and the like when necessary to prepare a modified conjugated diene-based polymer composition, and the modified conjugated diene-based polymer composition is heated and vulcanized. Among these, preferable is a modified conjugated diene-based polymer composition comprising a rubber component containing the modified conjugated diene-based polymer according to the present embodiment, and the silica-based inorganic filler. The silica-based inorganic filler is dispersed in the modified conjugated diene-based polymer according to the present embodiment. Thereby, the modified conjugated diene-based polymer can have a good balance between the hysteresis loss properties and the wet skid resistance and practically sufficient abrasion resistance and fracture strength, and obtain high processability when the modified conjugated diene-based polymer is formed into a vulcanized product. Preferably, the silica-based inorganic filler is contained as a reinforcing filler also in the case where the modified conjugated diene-based polymer composition according to the present embodiment is used for automobile parts such as tires and vibration-proof rubbers, and for vulcanized rubbers such as shoes.

In the conjugated diene-based polymer composition, a rubbery polymer other than the modified conjugated diene-based polymer according to the present embodiment can be used in combination with the modified conjugated diene-based polymer according to the present embodiment. Examples of such a rubbery polymer may include conjugated diene-based polymers or hydrogenated products thereof, random copolymers of a conjugated diene compound and a vinyl aromatic compound or hydrogenated products thereof, block copolymers of a conjugated diene compound and a vinyl aromatic compound or hydrogenated products thereof, non-diene-based polymers, and natural rubbers. Specifically, examples of the rubbery polymer may include butadiene rubbers or hydrogenated products thereof; isoprene rubbers or hydrogenated products thereof; styrene elastomers such as styrene-butadiene rubbers or hydrogenated products thereof, styrene-butadiene block copolymers or hydrogenated products thereof, and styrene-isoprene block copolymers or hydrogenated products thereof; and acrylonitrile-butadiene rubbers or hydrogenated products thereof.

Examples of the non-diene-based polymers may include olefin elastomers such as ethylene-propylene rubbers, ethylene-propylene-diene rubbers, ethylene-butene-diene rubbers, ethylene-butene rubbers, ethylene-hexene rubbers, ethylene-octene rubbers; butyl rubbers; brominated butyl rubbers; acrylic rubbers; fluorine rubbers; silicone rubbers; chlorinated polyethylene rubbers; epichlorohydrin rubbers; α,β-unsaturated nitrile-acrylic acid ester-conjugated diene copolymerization rubbers; urethane rubbers; and polysulfide rubbers.

The variety of rubbery polymers above may be a modified rubber having a polar functional group such as a hydroxyl group and an amino group. From the viewpoint of a balance between performance and processing properties, the weight average molecular weight is preferably 2,000 to 2,000,000, and more preferably 5,000 to 1,500,000. Alternatively, a low molecular weight, so-called liquid rubber can be used. One of these rubbery polymers may be used alone, or two or more thereof may be used in combination.

In the case of the modified conjugated diene-based polymer composition comprising the modified conjugated diene-based polymer according to the present embodiment and the rubbery polymer, a blending ratio (mass ratio) of modified conjugated diene-based polymer/rubbery polymer is preferably from 20/80 to 100/0, and more preferably from 30/70 to 90/10, and still more preferably from 50/50 to 80/20. At the blending ratio of modified conjugated diene-based polymer/rubbery polymer within the range, a vulcanized product can be obtained in which the balance between the hysteresis loss properties and the wet skid resistance is better, and the abrasion resistance and fracture strength are more satisfactory.

The silica-based inorganic filler is not particularly limited, and a known one can be used. Preferable are solid particles containing $SiO_2$ or $Si_3Al$ as a structural unit. More preferably, $SiO_2$ or $Si_3Al$ is the principal component of the structural unit. Specifically, examples of the silica-based inorganic filler may include inorganic fibrous substances such as silica, clay, talc, mica, diatomite, wollastonite, montmorillonite, zeolite, and glass fibers. Alternatively, a silica-based inorganic filler having a hydrophobized surface, or a mixture of the silica-based inorganic filler and an inorganic filler other than silica can be used. Among these, silica and glass fibers are preferable, and silica is more preferable from the viewpoint of reinforcing properties. Examples of silica may include anhydrous silica, precipitated silica, and synthetic silicate. Among these, preferable is precipitated silica from the viewpoint of a good balance between the effect of improving the fracture characteristics and the wet skid resistance.

In the modified conjugated diene-based polymer composition, from the viewpoint of obtaining practically sufficient abrasion resistance and fracture characteristics, the nitrogen adsorption specific surface area of the silica-based inorganic filler determined by the BET adsorption method is preferably from 100 to 300 m$^2$/g, and more preferably from 170 to 250 m$^2$/g. When necessary, a silica-based inorganic filler having a relatively small specific surface area (for example, a silica-based inorganic filler having a specific surface area of less than 200 m$^2$/g) and that having a relatively large specific surface area (for example, silica-based inorganic filler having a specific surface area of not less than 200 m$^2$/g) can be used in combination. Thereby, high abrasion resistance and fracture characteristics and hysteresis loss properties can be obtained in a highly balanced manner.

As described above, the amount of the silica-based inorganic filler to be blended in the modified conjugated diene-based polymer composition is preferably 0.5 to 300 parts by mass, more preferably from 5 to 200 parts by mass, and still more preferably from 20 to 100 parts by mass based on 100 parts by mass of the rubber component containing not less than 20 parts by mass of the modified conjugated diene-based polymer according to the present embodiment. The amount of the silica-based inorganic filler to be blended is preferably not less than 0.5 parts by mass from the viewpoint of demonstrating the effect of the added inorganic filler, while the amount is preferably not more than 300 parts by mass from the viewpoint of sufficiently dispersing the inorganic filler to obtain a composition having practically sufficient processability and mechanical strength.

The modified conjugated diene-based polymer composition may contain carbon black. Carbon black is not particularly limited, and for example, carbon black of each class such as SRF, FEF, HAF, ISAF, and SAF can be used. Among these, preferable is carbon black in which a nitrogen adsorption specific surface area is not less than 50 m$^2$/g, and a dibutyl phthalate (DBP) absorption number is not less than 80 mL/100 g.

The amount of carbon black to be blended is preferably from 0.5 to 100 parts by mass, more preferably from 3 to 100 parts by mass, and still more preferably from 5 to 50 parts by mass based on 100 parts by mass of a rubber component containing the modified conjugated diene-based polymer according to the present embodiment. The amount of carbon black to be blended is preferably not less than 0.5 parts by mass from the viewpoint of demonstrating dry grip performance and performance such as conductivity required in application of tires and the like, and preferably not more than 100 parts by mass from the viewpoint of dispersibility.

Moreover, the modified conjugated diene-based polymer composition may contain a metal oxide and a metal hydroxide in addition to the silica-based inorganic filler and carbon black. The metal oxide is a solid particle containing a compound represented by formula $M_xO_y$ (M represents a metal atom, and x and y each represent an integer of 1 to 6) as a principal component of the structural unit. For example, alumina, titanium oxide, magnesium oxide, and zinc oxide can be used. Alternatively, a mixture of the metal oxide and an inorganic filler other than the metal oxide can be used. The metal hydroxide is not particularly limited, and examples thereof may include aluminum hydroxide, magnesium hydroxide, and zirconium hydroxide.

The modified conjugated diene-based polymer composition may contain a silane coupling agent. The silane coupling agent has a function to make the interaction between the rubber component and the silica-based inorganic filler close, and has a group affinitive with or bondable to the rubber component and a group affinitive with or bondable to the silica-based inorganic filler. Generally, a compound having a sulfur bond portion, an alkoxy silyl group, a silanol group portion in one molecule is used. Specifically, examples of the silane coupling agent may include bis-[3-(triethoxysilyl)-propyl]-tetrasulfide, bis-[3-(triethoxysilyl)-propyl]disulfide, and bis[2-(triethoxysilyl)-ethyl]-tetrasulfide.

The amount of the silane coupling agent to be blended is preferably from 0.1 to 30 parts by mass, more preferably from 0.5 to 20 parts by mass, and still more preferably from 1 to 15 parts by mass based on 100 parts by mass of the silica-based inorganic filler. At an amount of the silane coupling agent to be blended within the range, the effect of the added silane coupling agent can be more remarkable.

In order to improve processability, the modified conjugated diene-based polymer composition may contain a rubber softener. As the rubber softener, mineral oil synthetic softening agents, liquid synthetic softening agents or low molecular weight synthetic softening agents are suitable. The mineral oil rubber softener referred to as a process oil or extender oil, which is used in order to soften the rubber, increase the volume, and improve the processability, is a mixture of an aromatic ring, a naphthene ring, and paraffin chains. If the carbon atoms of the paraffin chains are not less than 50% of the total carbons, the rubber softener is referred to as a paraffinic rubber softener. If the carbon atoms of the naphthene ring are from 30 to 45% of the total carbons, it is referred to as a naphthenic rubber softener. If the aromatic carbon atoms are more than 30% of the total carbons, it is referred to as an aromatic rubber softener. As the rubber softener used with the modified conjugated diene-aromatic vinyl copolymer according to the present embodiment, those containing a proper amount of aromatics are preferable because such a rubber softener tends to have affinity with the copolymer.

The amount of the rubber softener to be blended is preferably from 0 to 100 parts by mass, more preferably from 10 to 90 parts by mass, and still more preferably from 30 to 90 parts by mass based on 100 parts by mass of the rubber component containing the modified conjugated diene-based polymer according to the present embodiment. If the amount of the rubber softener to be blended is not more than 100 parts by mass based on 100 parts by mass of the rubber component, bleed out and stickiness of the surface of the composition can be suppressed.

The method for mixing the modified conjugated diene-based polymer according to the present embodiment with the other rubbery polymer and additives such as the silica-based inorganic filler, carbon black, other filler, the silane coupling agent, and the rubber softener is not particularly limited. Examples of the method may include a melt kneading method using an ordinary mixer such as an open roll mill, a Banbury mixer, a kneader, a single screw extruder, a twin screw extruder, and a multi screw extruder, and a method in which each component is dissolved and mixed, and thereafter, heated and a solvent is removed. Among these, preferable is the melt kneading method using a roll, a Banbury mixer, a kneader, or an extruder from the viewpoint of the productivity and good kneading properties. Moreover, a method of kneading the modified conjugated diene-based polymer and a variety of additives at one time, or a method of dividing the modified conjugated diene-based polymer and a variety of additives into several portions to perform mixing can be used.

The modified conjugated diene-based polymer composition may be a vulcanized composition obtained by vulcanization by a vulcanizing agent. As the vulcanizing agent, a radical generator such as organic peroxides and azo compounds, oxime compounds, nitroso compounds, polyamine compounds, sulfur, sulfur compounds can be used, for example. The sulfur compounds may include sulfur monochloride, sulfur dichloride, disulfide compounds, polymeric polysulfide compounds, and the like. The amount of the vulcanizing agent to be used is generally from 0.01 to 20 parts by mass, and preferably from 0.1 to 15 parts by mass based on 100 parts by mass of the rubber component containing the modified conjugated diene-based polymer according to the present embodiment. As the method for vulcanization, a conventionally known method can be used. The vulcanizing temperature is generally from 120 to 200° C., and preferably from 140 to 180° C.

In the vulcanization, a vulcanization accelerator may be used when necessary. As the vulcanization accelerator, a conventionally known material can be used. Examples of the vulcanization accelerator may include vulcanization accelerators such as sulfenamide-based vulcanization accelerators, guanidine-based vulcanization accelerators, thiuram-based vulcanization accelerators, aldehyde-amine-based vulcanization accelerators, aldehyde-ammonia-based vulcanization accelerators, thiazole-based vulcanization accelerators, thiourea-based vulcanization accelerators, and dithiocarbamate-based vulcanization accelerators. As the vulcanization aid, zinc oxide, stearic acid, and the like can be used. The amount of the vulcanization accelerator to be used is generally from 0.01 to 20 parts by mass, and preferably from 0.1 to 15 parts by mass based on 100 parts by mass of the rubber component containing the modified conjugated diene-based polymer according to the present embodiment.

In the modified conjugated diene-based polymer composition, a softening agent and filler other than those described above, and a variety of additives such as a thermal stabilizer, an antistatic agent, a weathering stabilizer, an antioxidant, a coloring agent, and a lubricant may be used within the range in which the purpose of the present embodiment is not impaired. As the other softening agent, a known softening agent can be used. Examples of the other filler specifically may include calcium carbonate, magnesium carbonate, aluminium sulfate, and barium sulfate. As the thermal stabilizer, antistatic agent, weathering stabilizer, antioxidant, coloring agent, and lubricant described above, known materials can be used.

Examples

According to Examples below, the present embodiment will be described more in detail, but the present embodiment will not be limited to Examples below. Samples were analyzed according to the methods shown below.

(1) Bound Styrene Content

A chloroform solution was used as a sample. Based on absorption of the UV at 254 nm by a phenyl group in styrene, the bound styrene content (% by mass) was measured (UV-2450: manufactured by Shimadzu Corporation).

(2) Microstructure of Butadiene Portion (1,2-Vinyl Linkage Content)

A carbon disulfide solution was used as a sample. Using a solution cell, an infrared spectrum was measured within the range of 600 to 1000 $cm^{-1}$, and the microstructure of a butadiene portion was determined based on the absorbance at a predetermined wave number by the expression according to the Hampton method (FT-IR230: manufactured by JASCO Corporation).

(3) Mooney Viscosity

According to JIS K 6300, a sample was preheated at 100° C. for 1 minute, and the viscosity after 4 minutes was measured.

(4) Molecular Weight and Molecular Weight Distribution

A chromatogram was obtained by measurement using a gel permeation chromatography (GPC) using a series of three columns in which a polystyrene-based gel was used as a filler. The weight average molecular weight (Mw) and the number average molecular weight (Mn) were determined according to a calibration curve using standard polystyrene. From the ratio of the weight average molecular weight to the number average molecular weight (Mw/Mn), an index of molecular weight distribution was calculated.

Tetrahydrofuran (THF) was used as an eluent.

The columns used were a guard column: Tosoh Corporation TSKguardcolumn HHR-H, and columns: Tosoh Corporation TSKgel G6000 HHR, TSKgel G5000 HHR, and TSKgel G4000 HHR.

On the condition of a temperature of an oven of 40° C. and a flow rate of THF of 1.0 mL/min, a molecular weight was measured using an RI detector HLC 8020 made by Tosoh Corporation. 10 mg of a sample was dissolved in 20 mL of THF, and 200λ of the solution was injected into the apparatus, and measured.

(5) Glass Transition Temperature (Tg)

According to ISO 22768: 2006, using a DSC3200S made by Mac Science Co., Ltd., the DSC curve was recorded while the temperature was raised from −100° C. at the rate of 20° C./min under a flow of helium of 50 mL/min. The peak top of the DSC differential curve (Inflection point) was defined as the glass transition temperature.

Example 1

Two autoclaves were connected to each other in series, the autoclave having an inner volume of 10 L and a ratio of an inner height to a diameter (L/D) of 4, and having an inlet in the bottom of the autoclave and an outlet on the top thereof, and a stirrer and a jacket for controlling a temperature. Of the autoclaves, the first autoclave was used as a polymerization reactor, and the second autoclave was used as a modification reactor.

Mixing was performed on the condition of 16.0 g/min of butadiene, 8.0 g/min of styrene, and 125.6 g/min of n-hexane from which impurities such as moisture were removed in advance. For impurities deactivation treatment, the mixture was further mixed with 0.075 mmol/min of n-butyllithium (n-butyllithium for treatment) by a static mixer immediately before the mixture was fed to the first reactor, and continuously fed to the bottom of the first reactor. Further, 2,2-bis(2-oxolanyl)propane was fed as a polar substance at a rate of 0.020 g/min, and n-butyllithium was fed as a polymerization initiator at a rate of 0.150 mmol/min to the bottom of the first reactor. The polymerization reaction was continued such that the inner temperature at the outlet of the reactor was 90° C.

The temperature of the second reactor was kept at 85° C., and 1,4-bis[3-(trimethoxysilyl)propyl]piperazine was added as a modifier at a rate of 0.0375 mmol/min from the bottom of the second reactor to perform a modification (coupling) reaction.

An antioxidant (BHT) was continuously added to a polymer solution flowed from the top of the second reactor at 0.048 g/min (n-hexane solution) so that the flow rate was 0.2 g per 100 g of the polymer, and the modification reaction was completed. Then, the solvent was removed to obtain a modified conjugated diene-based polymer.

Further, 37.5 parts by mass of an S-RAE oil (NC-140, made by JX Nippon Oil & Energy Corporation) per 100 parts by mass of the polymer was added to the modified conjugated diene-based polymer solution, and the solvent was removed by a drum dryer to obtain an oil-extended modified conjugated diene-based polymer (Sample A).

The Mooney viscosity at 100° C. of Sample A was 80.0, the polystyrene equivalent weight average molecular weight measured by GPC was 908,000, and the number average molecular weight was 393,000. Moreover, as a result of the measurement of the sample before oil extension, the bound styrene content was 33% by mass, the vinyl linkage content (1,2-linkage content) in butadiene bond units was 38 mol %, and the glass transition temperature measured by DSC was −25° C.

Example 2

An oil-extended modified conjugated diene-based polymer (Sample B) was obtained in the same manner as in Example 1 except that the amount of 1,4-bis[3-(trimethoxysilyl)propyl]piperazine to be added as the modifier was 0.0563 mmol/min.

The result of an analysis of Sample B was shown in Table 1.

Example 3

An oil-extended modified conjugated diene-based polymer (Sample C) was obtained in the same manner as in Example 1 except that the modifier was changed from 1,4-bis[3-(trimethoxysilyl)propyl]piperazine to 1,4-bis[3-(triethoxysilyl)propyl]piperazine.

The result of an analysis of Sample C was shown in Table 1.

Example 4

An oil-extended modified conjugated diene-based polymer (Sample D) was obtained in the same manner as in Example 1 except that the modifier was changed from 1,4-bis[3-(trimethoxysilyl)propyl]piperazine to 1,4-bis[3-(dimethoxymethylsilyl)propyl]piperazine, and the amount of the modifier to be added was 0.0563 mmol/min.

The result of an analysis of Sample D was shown in Table 2.

Example 5

An oil-extended modified conjugated diene-based polymer (Sample E) was obtained in the same manner as in Example 1 except that the modifier was changed from 1,4-bis[3-(trimethoxysilyl)propyl]piperazine to 1,3-bis[3-(trimethoxysilyl)propyl]hexahydropyrimidine.

The result of an analysis of Sample E was shown in Table 2.

Comparative Example 1

An oil-extended modified conjugated diene-based polymer (Sample F) was obtained in the same manner as in Example 1 except that the modifier was changed from 1,4-bis[3-(trimethoxysilyl)propyl]piperazine to bis[3-(trimethoxysilyl)propyl]-N-methylamine.

The result of an analysis of Sample F was shown in Table 3.

Comparative Example 2

An oil-extended modified conjugated diene-based polymer (Sample G) was obtained in the same manner as in Example 1 except that the modifier was changed from the 1,4-bis[3-(trimethoxysilyl)propyl]piperazine to 1,2-bis(3-triethoxysilyl)ethane.

The result of an analysis of Sample G was shown in Table 3.

Comparative Example 3

An oil-extended modified conjugated diene-based polymer (Sample H) was obtained in the same manner as in Example 1 except that the amount of n-butyllithium (polymerization initiator) to be added was 0.120 mmol/min, the amount of 2,2-bis(2-oxolanyl)propane to be added was 0.018 g/min, the modifier was changed from 1,4-bis[3-(trimethoxysilyl)propyl]piperazine to 1-[3-(triethoxysilyl)propyl]-4-methylpiperazine, and the amount of the modifier to be added was 0.130 mmol/min.

The result of an analysis of Sample H was shown in Table 3.

TABLE 1

| | | | Example 1 | Example 2 | Example 3 |
|---|---|---|---|---|---|
| Sample No. | | | A | B | C |
| Polymerization condition | Butadiene | (g/min) | 16.0 | 16.0 | 16.0 |
| | Styrene | (g/min) | 8.0 | 8.0 | 8.0 |
| | n-Hexane | (g/min) | 125.6 | 125.6 | 125.6 |

TABLE 1-continued

|  |  |  | Example 1 | Example 2 | Example 3 |
|---|---|---|---|---|---|
|  | Polymerization temperature | (° C.) | 90 | 90 | 90 |
|  | n-butyllithium for treatment | (mmol/min) | 0.075 | 0.075 | 0.075 |
|  | n-butyllithium for polymerization initiator | (mmol/min) | 0.150 | 0.150 | 0.150 |
|  | Amount of polar substance[*1] to be added | (g/min) | 0.020 | 0.020 | 0.020 |
|  | Modifier   Kind of modifier[*2] |  | BTMSP | BTMSP | BTESP |
|  |                    Amount to be added | (mmol/min) | 0.0375 | 0.0563 | 0.0375 |
|  |                    Lithium equivalent ratio[*3] |  | 1.0 | 1.5 | 1.0 |
| Analysis value | Bound styrene content | (% by mass) | 33 | 33 | 33 |
|  | Vinyl linkage content | (mol %) | 38 | 38 | 38 |
|  | Glass transition temperature | (° C.) | −25 | −25 | −25 |
|  | Weight average molecular weight (Mw) | (thousand) | 908 | 870 | 824 |
|  | Number average molecular weight (Mn) | (thousand) | 393 | 399 | 379 |
|  | Mw/Mn |  | 2.31 | 2.18 | 2.17 |
|  | Mooney viscosity after 37.5 phr of oil extended (100° C.) |  | 80.0 | 89.7 | 77.3 |

[*1] 2,2-bis(2-oxolanyl)propane
[*2] BTMSP: 1,4-bis[3-(trimethoxysilyl)propyl]piperazine BTESP: 1,4-bis[3-(triethoxysilyl)propyl]piperazine
[*3] Molar ratio of the total amount of an alkoxy group bonded to a silyl group contained in the added modifier to the total amount of n-butyllithium to be added

TABLE 2

|  |  |  | Example 4 | Example 5 |
|---|---|---|---|---|
| Sample No. |  |  | D | E |
| Polymerization condition | Butadiene | (g/min) | 16.0 | 16.0 |
|  | Styrene | (g/min) | 8.0 | 8.0 |
|  | n-Hexane | (g/min) | 125.6 | 125.6 |
|  | Polymerization temperature | (° C.) | 90 | 90 |
|  | n-butyllithium for treatment | (mmol/min) | 0.075 | 0.075 |
|  | n-butyllithium for polymerization initiator | (mmol/min) | 0.150 | 0.150 |
|  | Amount of polar substance[*1] to be added | (g/min) | 0.020 | 0.020 |
|  | Modifier   Kind of modifier[*2] |  | BDMMSP | BTMSHP |
|  |                    Amount to be added | (mmol/min) | 0.0563 | 0.0375 |
|  |                    Lithium equivalent ratio[*3] |  | 1.0 | 1.0 |
| Analysis value | Bound styrene content | (% by mass) | 33 | 33 |
|  | Vinyl linkage content | (mol %) | 38 | 38 |
|  | Glass transition temperature | (° C.) | −25 | −25 |
|  | Weight average molecular weight (Mw) | (thousand) | 746 | 888 |
|  | Number average molecular weight (Mn) | (thousand) | 352 | 382 |
|  | Mw/Mn |  | 2.12 | 2.32 |
|  | Mooney viscosity after 37.5 phr of oil extended (100° C.) |  | 57.9 | 78.9 |

[*1] 2,2-bis(2-oxolanyl)propane
[*2] BDMMSP: 1,4-bis[3-(dimethoxymethylsilyl)propyl]piperazine BTMSHP: 1,3-bis[3-(trimethoxysilyl)propyl]hexahydropyrimidine
[*3] Molar ratio of the total amount of an alkoxy group bonded to a silyl group contained in the added modifier to the total amount of n-butyllithium to be added

TABLE 3

|  |  |  | Comparative Example 1 | Comparative Example 2 | Comparative Example 3 |
|---|---|---|---|---|---|
| Sample No. |  |  | F | G | H |
| Polymerization condition | Butadiene | (g/min) | 16.0 | 16.0 | 16.0 |
|  | Styrene | (g/min) | 8.0 | 8.0 | 8.0 |
|  | n-Hexane | (g/min) | 125.6 | 125.6 | 125.6 |
|  | Polymerization temperature | (° C.) | 90 | 90 | 90 |
|  | n-butyllithium for treatment | (mmol/min) | 0.075 | 0.075 | 0.075 |
|  | n-butyllithium for polymerization initiator | (mmol/min) | 0.150 | 0.150 | 0.120 |
|  | Amount of polar substance[*1] to be added | (g/min) | 0.020 | 0.020 | 0.018 |
|  | Modifier   Kind of modifier[*2] |  | BTMSA | BTESE | TESMP |
|  |                    Amount to be added | (mmol/min) | 0.0375 | 0.0375 | 0.1300 |
|  |                    Lithium equivalent ratio[*3] |  | 1.0 | 1.0 | 2.0 |
| Analysis value | Bound styrene content | (% by mass) | 33 | 33 | 33 |
|  | Vinyl linkage content | (mol %) | 38 | 38 | 39 |
|  | Glass transition temperature | (° C.) | −25 | −25 | −25 |
|  | Weight average molecular weight (Mw) | (thousand) | 901 | 901 | 717 |
|  | Number average molecular weight (Mn) | (thousand) | 384 | 397 | 372 |
|  | Mw/Mn |  | 2.35 | 2.27 | 1.93 |
|  | Mooney viscosity after 37.5 phr of oil extended (100° C.) |  | 75.1 | 74.8 | 54.9 |

[*1] 2,2-bis(2-oxolanyl)propane
[*2] BTMSA: bis(3-trimethoxysilylpropyl)-N-methylamine BTESE: 1,2-bis[3-(triethoxysilyl)ethane TESMP: 1-[3-(triethoxysilyl)propyl]-4-methylpiperazine
[*3] Molar ratio of the total amount of an alkoxy group bonded to a silyl group contained in the added modifier to the total amount of n-butyllithium to be added

Examples 6 to 10, Comparative Examples 4 to 6

Each of the samples shown in Tables 1 to 3 (Sample A to Sample H) was used as a raw material rubber to obtain a rubber composition containing the raw material rubber according to the blend shown below.

Oil-extended modified conjugated diene-based polymer (Samples A to H): 137.5 parts by mass
Silica (Ultrasil VN3, made by Evonik Industries AG): 75.0 parts by mass
Carbon black (SEAST KH (N339), made by Tokai Carbon Co., Ltd.): 5.0 parts by mass
Silane coupling agent (Si75, made by Evonik Industries AG): 6.0 parts by mass
S-RAE oil (JOMO Process NC140, made by JX Nippon Oil & Energy Corporation): 4.5 parts by mass
Zinc oxide: 2.5 parts by mass
Stearic acid: 1.5 parts by mass
Antioxidant (N-isopropyl-N'-phenyl-p-phenylenediamine): 2.0 parts by mass
Sulfur: 2.2 parts by mass
Vulcanization accelerator (N-cyclohexyl-2-benzothiazylsulfinamide): 1.7 parts by mass
Vulcanization accelerator (diphenylguanidine): 2.0 parts by mass
Total: 240.9 parts by mass The rubber composition was kneaded by the following method.

A sealed kneader (the inner volume of 0.3 L) including a temperature control apparatus was used. As a first stage of kneading, the raw material rubber (Samples A to H), the fillers (silica, carbon black), the organic silane coupling agent, the process oil, zinc oxide, and stearic acid were kneaded on the condition of a fill factor of 65%, the number of rotation of a rotor of 50/57 rpm. At this time, the temperature of the sealed kneader was controlled to obtain a rubber composition at a discharge temperature (rubber compound) of 155 to 160° C.

Next, as a second stage of kneading, the obtained rubber compound was cooled to room temperature. The antioxidant was added, and the product was again kneaded in order to improve dispersion of silica. In this case, the temperature of the mixer was controlled to adjust the discharge temperature (rubber compound) at 155 to 160° C.

After cooling, as a third stage of kneading, sulfur and the vulcanization accelerator were added to the blended product, and the product was kneaded by an open roll mill set at 70° C. Subsequently, the obtained product was molded, and vulcanized at 160° C. for 20 minutes by a vulcanizing press. After vulcanization, physical properties of the rubber composition were measured. The measurement result of physical properties was shown in Tables 4 and 5.

The physical properties of the rubber composition were measured by the following method.

(1) Compound Mooney Viscosity

Using a Mooney viscometer, according to JIS K6300-1, a sample was preheated at 130° C. for 1 minute; and the rotor was rotated 2 turns per minute, and the viscosity after 4 minutes was measured. The Mooney viscosity indicates that processability is higher as the value is smaller.

(2) Tensile Strength

The tensile strength was measured by the tensile test method according to JIS K6251, and indexed wherein Comparative Example 4 was 100.

(3) Viscoelasticity Parameter

Using a viscoelasticity tester (ARES) made by Rheometric Scientific, Inc., the viscoelasticity parameter was measured in a twist mode. Each of the measured values was indexed wherein Comparative Example 4 was 100. Tan δ measured at 0° C., a frequency of 10 Hz, and a strain of 1% was defined as an index of the wet grip performance. It indicates that the wet grip performance is higher as the value is larger. Moreover, tan δ measured at 50° C., a frequency of 10 Hz, and a strain of 3% was defined as an index of fuel efficiency properties. It indicates that fuel efficiency performance is higher as the value is smaller.

(4) Abrasion Resistance

Using an AKRON Abrasion Tester (made by YASUDA SEIKI SEISAKUSHO, LTD.), according to JIS K6264-2, the amount of wear at a load of 44.1 N and the number of rotation of 1000 was measured, and indexed wherein Comparative Example 4 was 100. The abrasion resistance is higher as the index is larger.

TABLE 4

| | | Example 6 | Example 7 | Example 8 | Example 9 | Example 10 |
|---|---|---|---|---|---|---|
| Oil-extended styrene-butadiene copolymer | | A | B | C | D | E |
| Compound Mooney viscosity | | 54 | 63 | 58 | 55 | 57 |
| Physical properties of vulcanized product | Tensile strength index | 111 | 111 | 105 | 104 | 110 |
| | Abrasion resistance index | 104 | 115 | 113 | 114 | 113 |
| | 0° C. tan δ (strain 1%) index | 104 | 106 | 104 | 101 | 106 |
| | 50° C. tan δ (strain 3%) index | 92 | 87 | 93 | 98 | 91 |

TABLE 5

| | | Comparative Example 4 | Comparative Example 5 | Comparative Example 6 |
|---|---|---|---|---|
| Oil-extended styrene-butadiene copolymer | | F | G | H |
| Compound Mooney viscosity | | 51 | 58 | 63 |
| Physical properties of vulcanized product | Tensile strength index | 100 | 111 | 110 |
| | Abrasion resistance index | 100 | 95 | 101 |
| | 0° C. tan δ (strain 1%) index | 100 | 98 | 108 |
| | 50° C. tan δ (strain 3%) index | 100 | 116 | 96 |

As shown in Tables 4 and 5, it was found out that in the modified conjugated diene-based polymer compositions in Examples 6 to 10, tan δ at a high temperature was lower, which means the hysteresis loss was smaller and the lower rolling resistance of the tire was realized, tan δ at a low temperature was higher, which means the wet skid resistance was higher than in the compositions in Comparative Examples 4 and 5. It was also found out that the abrasion resistance and tensile strength were excellent. Moreover, compared to Comparative Example 6, it was found out that the Compound Mooney viscosity was lower, and the balance between the processability and the physical properties of the vulcanized product was better.

Example 11

An autoclave having an inner volume of 10 L, including a stirrer and a jacket, and capable of controlling the temperature was used as a reactor. 777 g of butadiene, 273 g of styrene, 4800 g of cyclohexane, and 1.30 g of 2,2-bis(2-oxolanyl) propane as the polar substance from which impurities were removed in advance were placed in the reactor, and the inner temperature of the reactor was kept at 37° C. As the polymerization initiator, a cyclohexane solution containing 15.1 mmol of n-butyllithium was fed to the reactor. After the polymerization reaction was started, the temperature within the reactor started to be raised by the heat generated by the polymerization, and finally reached 70° C. After the polymerization reaction was completed, 3.39 mmol of 1,4-bis[3-(trimethoxysilyl)propyl]piperazine was added to the reactor, and the modification reaction was performed at 69° C. for 5 minutes. At this time, the molar ratio of the total amount of the methoxy group bonded to the silyl group in the added modifier to the amount of n-butyllithium to be added was 1.35. 2.1 g of the antioxidizing agent (BHT) was added to the polymer solution, and the solvent was removed by steam stripping, and the resulting polymer solution was dried by a dryer to obtain a styrene-butadiene copolymer (Sample I) having a modified component.

As a result of analyzing (Sample I), the bound styrene content was 26% by mass, and the bound butadiene content was 74%.

The Mooney viscosity of the polymer was 60.

The vinyl linkage content (1,2-linkage content) of the microstructure of the butadiene portion determined from the result of the measurement using an infrared spectrophotometer by calculation according to the Hampton method was 56%.

The glass transition temperature was −23° C.

The polystyrene equivalent weight average molecular weight (Mw) measured by GPC was 372,000, the number average molecular weight (Mn) was 318,000, and the Mw/Mn was 1.17.

Comparative Example 7

An autoclave having an inner volume of 10 L, including a stirrer and a jacket, and capable of controlling the temperature was used as a reactor. 777 g of butadiene, 273 g of styrene, 4800 g of cyclohexane, and 0.52 g of 2,2-bis(2-oxolanyl) propane as the polar substance from which impurities were removed in advance were placed in the reactor, and the inner temperature of the reactor was kept at 43° C. As the polymerization initiator, a cyclohexane solution containing 6.52 mmol of n-butyllithium was fed to the reactor. After the polymerization reaction was started, the temperature within the reactor started to be raised by the heat generated by the polymerization, and finally reached 71° C.

After the polymerization reaction was completed, 4.35 mmol of 1-[3-(triethoxysilyl)propyl]-4-methylpiperazine was added to the reactor, and the modification reaction was performed at 70° C. for 5 minutes. 2.1 g of the antioxidizing agent (BHT) was added to the polymer solution, and the solvent was removed by steam stripping, and the resulting polymer solution was dried by a dyer to obtain a styrene-butadiene copolymer (Sample J) having a modified component.

As a result of analyzing (Sample J), the bound styrene content was 26% by mass, and the bound butadiene content was 74%.

The Mooney viscosity of the polymer was 58.

The vinyl linkage content (1,2-linkage content) of the microstructure of the butadiene portion determined from the result of the measurement using an infrared spectrophotometer by calculation according to the Hampton method was 56%.

The glass transition temperature was −23° C.

The polystyrene equivalent weight average molecular weight (Mw) measured by GPC was 368,000, the number average molecular weight (Mn) was 281,000, and the Mw/Mn was 1.31.

Example 12, Comparative Example 8

Each of the samples (Samples I and J) obtained in Example 11 and Comparative Example 7 was used as a raw material rubber to obtain a rubber composition containing the raw material rubber according to the blend shown below.

Modified conjugated diene-based polymer (Samples I and J): 100.0 parts by mass

Silica (Ultrasil VN3, made by Evonik Industries AG): 25.0 parts by mass

Carbon black (SEAST KH (N339), made by Tokai Carbon Co., Ltd.): 20.0 parts by mass Silane coupling agent (Si75, made by Evonik Industries AG): 2.0 parts by mass S-RAE oil (JOMO Process NC140, made by JX Nippon Oil & Energy Corporation): 5.0 parts by mass Zinc oxide: 3.0 parts by mass Stearic acid: 2.0 parts by mass Antioxidant (N-isopropyl-N'-phenyl-p-phenylenediamine): 1.0 part by mass Sulfur: 1.9 parts by mass Vulcanization accelerator (N-cyclohexyl-2-benzothiazylsulfinamide): 1.0 part by mass Vulcanization accelerator (diphenylguanidine): 1.5 parts by mass Total: 162.4 parts by mass The rubber composition was kneaded by the same method as in Examples 6 to 10 and Comparative Examples 4 to 6. The physical properties of the rubber composition were also measured by the same method as in Examples 6 to 10 and Comparative Examples 4 to 6. The measurement result of the physical properties was shown in Table 6. The index values by which the result is expressed were determined wherein Comparative Example 8 was "100."

TABLE 6

| | | Example 12 | Comparative Example 8 |
|---|---|---|---|
| Styrene-butadiene copolymer | | I | J |
| Compound Mooney viscosity | | 64 | 71 |
| Physical properties of vulcanized product | Tensile strength index | 99 | 100 |
| | Abrasion resistance index | 101 | 100 |
| | 0° C. tan δ (strain 1%) index | 103 | 100 |
| | 50° C. tan δ (strain 3%) index | 96 | 100 |

As shown in Table 6, it was found out that in the modified conjugated diene-based polymer composition in Example 12, tan δ at a high temperature is lower, which means the hysteresis loss is smaller and the lower rolling resistance of the tire is realized, tan δ at a low temperature is higher, which means the wet skid resistance is higher than in the composition in Comparative Example 8. Moreover, it was found out that the compound Mooney viscosity is low, and the balance between the processability and the physical properties of the vulcanized product is good. It was also found out that the abrasion resistance and tensile strength are excellent.

As above, it was found out that the modified conjugated diene-based polymer according to the present Examples has a good balance between the hysteresis loss properties and the wet skid resistance, practically sufficient abrasion resistance and fracture strength, and high processability when the modified conjugated diene-based polymer is formed into a vulcanized product.

The present application is based on Japanese Patent Application No. 2009-230412 filed on Oct. 2, 2009 with the Japan Patent Office, and the contents thereof, which were incorporated herein by reference.

INDUSTRIAL APPLICABILITY

According to the method for producing the modified conjugated diene-based polymer according to the present invention, the modified conjugated diene-based polymer having the good balance between the hysteresis loss properties and the wet skid resistance, practically sufficient abrasion resistance and fracture strength, and high processability when formed into a vulcanized product, can be obtained and the modified conjugated diene-based polymer can be suitably used as a material for a variety of members such as tire treads, footwear, and industrial products.

What is claimed is:

1. A method of producing a modified conjugated diene-based polymer, comprising:
a polymerization step of polymerizing a conjugated diene compound or copolymerizing a conjugated diene compound with an aromatic vinyl compound using an alkali metal compound or an alkaline earth metal compound as a polymerization initiator to obtain a conjugated diene-based polymer having a reactive end, and
a modifying step of reacting a modifier with the reactive end of the conjugated diene-based polymer, the modifier being a compound represented by formula (1):

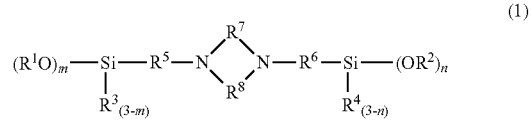

wherein $R^1$ to $R^4$ each independently represent an alkyl group or aryl group having 1 to 20 carbon atoms; $R^5$ and $R^6$ each independently represent an alkylene group having 1 to 20 carbon atoms; $R^7$ and $R^8$ each independently represent a hydrocarbon group having 1 to 6 carbon atoms, and form a ring structure of a 5 or more membered ring with two adjacent N; and m and n each independently represent an integer of 2 or 3.

2. The method of producing the modified conjugated diene-based polymer according to claim 1, wherein all the silyl groups in the modifier are each silyl group to which three alkoxy groups are bonded.

3. The method of producing the modified conjugated diene-based polymer according to claim 1, wherein a total number of moles of the alkoxy group bonded to the silyl group in the modifier is within a range of 0.8 to 3 times number of moles of the polymerization initiator to be added.

4. The method of producing the modified conjugated diene-based polymer according to claim 1, wherein the polymerization step is continuous.

5. The method of producing the modified conjugated diene-based polymer according to claim 1, wherein a polystyrene equivalent number average molecular weight of the modified conjugated diene-based polymer measured by gel permeation chromatography (GPC) is 200,000 to 600,000.

6. A modified conjugated diene-based polymer obtained by the method of producing the modified conjugated diene-based polymer according to claim 1.

7. A modified conjugated diene-based polymer composition comprising:
100 parts by mass of a rubber component containing not less than 20 parts by mass of the modified conjugated diene-based polymer according to claim 6, and
0.5 to 300 parts by mass of a silica-based inorganic filler.

8. The method of producing the modified conjugated diene-based polymer according to claim 2, wherein a total number of moles of the alkoxy group bonded to the silyl group in the modifier is within a range of 0.8 to 3 times number of moles of the polymerization initiator to be added.

9. The method of producing the modified conjugated diene-based polymer according to claim 2, wherein the polymerization step is continuous.

10. The method of producing the modified conjugated diene-based polymer according to claim 2, wherein a polystyrene equivalent number average molecular weight of the modified conjugated diene-based polymer measured by gel permeation chromatography (GPC) is 200,000 to 600,000.

11. A modified conjugated diene-based polymer obtained by the method of producing the modified conjugated diene-based polymer according to claim 2.

* * * * *